(12) United States Patent
Mangal

(10) Patent No.: US 7,567,804 B1
(45) Date of Patent: Jul. 28, 2009

(54) METHOD AND SYSTEM FOR ESTABLISHING WIRELESS IP CONNECTIVITY

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1020 days.

(21) Appl. No.: 10/986,620

(22) Filed: Nov. 12, 2004

(51) Int. Cl.
*H04W 4/00* (2006.01)

(52) U.S. Cl. .................... 455/435.1; 455/411; 455/433; 370/328; 370/352

(58) Field of Classification Search .................. 455/442, 455/456; 370/352
See application file for complete search history.

(56) References Cited

U.S. PATENT DOCUMENTS

2006/0121916 A1 * 6/2006 Aborn et al. ............. 455/456.5

* cited by examiner

*Primary Examiner*—Simon Sing
*Assistant Examiner*—Simon King

(57) ABSTRACT

A method and system for establishing wireless IP connectivity, in which a wireless communication device (WCD) obtains a routable IP address during its registration with a radio access network, rather than first registering with the RAN and then subsequently requesting and acquiring packet-data connectivity. Preferably, when the WCD sends a radio access registration request that triggers a registration notification to a home location register (HLR), the HLR or an associated entity will assign an IP address for use by the WCD and will deliver the assigned IP address in a registration notification response message to the RAN. The RAN will then deliver the assigned IP address to the WCD over the air in a radio access registration response message. The WCD may then use the assigned IP address to engage in packet data communications, such as to set up a VoIP session with another IP node, for instance.

18 Claims, 3 Drawing Sheets

METHOD AND SYSTEM FOR ESTABLISHING WIRELESS IP CONNECTIVITY

FIELD OF THE INVENTION

The present invention relates to wireless communications and, more particularly, to cellular wireless packet data communications. The invention can be usefully employed to facilitate establishment of end-to-end voice-over-IP (VoIP) connectivity from a cellular wireless communication device such as a cell phone. Further, the invention can extend to other arrangements as well.

BACKGROUND

It is generally known for a cellular wireless communication device (WCD) to engage in voice calls via a cellular radio access network (RAN). A traditional RAN includes one or more mobile switching centers (MSCs), each of which is connected with one or more base station controllers (BSCs), and each BSC is in turn connected with one or more base transceiver stations (BTSs) that define cellular wireless coverage areas in which wireless communication devices can operate.

Typically, each BTS includes an antenna tower with antennas arranged to radiate in a desired pattern so as to produce a desired level of coverage, defining a cell and a number of cell sectors. Each BSC then functions to manage air interface communications, such as to assign air interface traffic channels over which WCDs can communicate, and to manage handoff of communications as a WCD moves between coverage areas (e.g., sectors). Each MSC, in turn, functions as a switching point, to provide connectivity between various WCDs in its coverage, and between WCDs and the public switched telephone network, and further to facilitate handoff of communications as a WCD moves between BSC serving areas or MSC serving areas.

Conventionally, each WCD has an assigned identifier, such as a mobile identification number (MIN) or mobile directory number (MDN), and each WCD has a service profile stored in a home location register (HLR). Each MSC is in turn coupled with the HLR, typically by an out of band signaling network such as a Signaling System #7 (SS7) network for instance.

When a WCD powers on in, or otherwise enters, a coverage area (such as an area served by a particular BTS, BSC, or MSC), the WCD will register with the radio network infrastructure, so the system can know where the WCD is located (e.g., for purposes of directing calls to the WCD) and so the system can verify that the WCD is authorized to engage in wireless communications. In a typical radio network registration process, the WCD sends a radio access registration message over the air to the RAN and, assuming successful registration, then receives a radio access registration response message from the RAN. Further, during a typical radio network registration process, the HLR will deliver a copy of the WCD's service profile to the serving MSC, so that the MSC can then reference the profile when serving the WCD.

In a system compliant with the well known CDMA (e.g., CDMA2000®) and IS-41 protocols, for example, a WCD engages in radio network registration by sending over the air (in an air interface access channel) to the BTS and, in turn to the BSC, an "access probe," which carries an identifier of the mobile station and other pertinent information. When the BSC receives the access probe, the BSC passes the access probe along to the MSC, and the MSC then sends an IS-41 "Registration Notification" (REGNOT) message to the HLR. The HLR in turn updates the WCD's profile to indicate where the WCD is operating (e.g., which MSC is serving the WCD) and may further carry out an authentication process, and the HLR then sends an IS-41 registration notification return result (regnot_rr), typically including the WCD's service profile, to the MSC. The MSC then sends a registration acknowledgement over the air (in an air interface paging channel) to the WCD to complete the registration process.

Once the WCD is registered with the RAN, the WCD can then place and receive voice calls (assuming the WCD's service profile and configuration allow it). To place a call, for instance, the WCD may send a call origination message over the air (in an air interface access channel) to the RAN, providing a set of dialed digits indicative of a called party phone number. Upon receipt of the call origination message, the MSC may then direct the BSC to assign an air interface traffic channel for use by the WCD, and the MSC may further engage in call setup signaling (e.g., ISDN User Part (ISUP) signaling) to set up the call with a remote switch serving the called party. When the called party answers, the MSC may then connect the call through to the WCD. Similarly, when the MSC receives a request to connect an incoming call to the WCD, the MSC may page and alert the WCD over the air (in an air interface paging channel). When the WCD answers the call, the MSC may then connect the call through to the WCD.

One of the important features of many RAN systems is the ability to manage WCD mobility, such as handoff of calls from one coverage area to another as a WCD moves between coverage areas. As noted above, a BSC typically serves this function for handoffs between coverage areas (e.g., sectors) that the BSC serves. For handoffs between BSCs, on the other hand, IS-41 defines a process in which the BSC that first handles the call (the "anchor" BSC) remains in the call path, and bearer traffic is shunted between that anchor BSC and the BSC currently serving the WCD, so as to maintain connectivity as the WCD moves between BSC coverage areas.

It is also generally known today for WCDs to be able to engage in wireless packet data communication. In a system compliant with the well known CDMA2000® protocol, for instance, a WCD (such as a cell phone, wirelessly equipped PDA, or wirelessly-equipped computer) can obtain packet data connectivity by signaling with the RAN and by signaling through the RAN with a packet data serving node (PDSN) that sits as a gateway on a packet-switched network.

In particular, after the WCD enters a wireless coverage area and successfully engages in radio network registration, the WCD can send a packet-data origination message via an air interface access channel to the RAN. Under CDMA2000®, the packet-data origination message may be largely the same as a traditional call origination message, except that it would include a special service option code that signifies a request to establish packet-data connectivity. Upon receipt of the packet-data origination message, a BSC or other radio network controller (RNC) in the RAN may then assign an air interface traffic channel for use by the WCD as a radio link, and the RAN may signal to a PDSN to trigger establishment of a data link, such as a point-to-point protocol session (i.e., a serialized packet-data connection), between the PDSN and the WCD. Once that data link is established, the WCD may then send a mobile-IP registration request to the PDSN, which the PDSN may forward to a mobile-IP home agent, and the home agent may then assign an IP address for use by the WCD to engage in communications on the packet-switched network.

It is further known for WCDs to be able to engage in voice-over-IP (VoIP) and other packet-based real-time media communications. For example, after a WCD gains radio access and then packet data connectivity as described above, the WCD may engage in call setup signaling, such as Session Initiation Protocol (SIP) signaling or H.323 signaling for instance, to set up a packet-based real-time media session with another entity on the packet-switched network. Such a session could carry media according to the well known Real-time Transport Protocol (RTP), as described in RFC 1889, or in some other manner.

When a WCD engages in wireless packet data communications, and particularly packet-based real-time media communications such as VoIP, an additional mobility management issue arises. In particular, as a WCD moves between PDSN serving systems, the WCD must establish connectivity with the new PDSN, and the mobile-IP home agent must be informed that the new PDSN is serving the WCD. In some cases, this process of handing off to a new PDSN can take on the order of 6 seconds to complete, which may unfortunately disrupt real-time media communications.

SUMMARY

The present invention provides an improved arrangement and process that helps to avoid the foregoing problem. According to the invention, a WCD will obtain a routable network address (e.g., IP address) during its registration with the RAN, rather than first registering with the RAN and then subsequently requesting packet-data connectivity. In accordance with an exemplary embodiment of the invention, for instance, when the WCD sends a radio access registration request that triggers a registration notification to the HLR, the HLR or an associated entity will assign a network address for use by the WCD and will deliver the assigned network address in a registration notification response message to the RAN. The RAN will then deliver the assigned network address in a radio access registration response message over the air to the WCD, for use by the WCD to engage in communications on a packet-switched network.

Further according to the exemplary embodiment, the RAN will provide direct packet-data connectivity with the packet-switched network. In a preferred arrangement, for instance, the BSC (or another RNC) will itself sit as a node on the packet-switched network, so packet data can flow more directly (i) over the radio link between the WCD and the BSC and (ii) between the BSC and other entities on the packet-switched network, without the need for a PDSN to sit between the RAN and the packet-switched network.

In place of the traditional MSC will also be a media gateway controller (MGC), known in the art as a "softswitch," which also sits as a node on the packet-switched network. The MGC, like a conventional MSC, will have a signaling link (e.g., an SS7 network) with the HLR and with other switching points. Further, as a node on the packet-switched network, the MGC can engage in communication with other entities on the packet-switched network.

In the preferred arrangement, a WCD will send a radio access registration message over the air to the BSC, which the BSC will forward (over the packet-switched network) to the MGC. As a conventional MSC would do, the MGC will then send a registration notification message (e.g., an IS-41 REG-NOT) to the HLR. At this point, however, the HLR or another entity will then assign a network address (e.g., IP address) for use by the WCD and will deliver the assigned network address in a registration notification response message (e.g., an IS-41 regnot_rr) to the MGC. Upon receipt of that response, like a conventional MSC, the MGC will then send a radio access registration response message to the WCD. But in accordance with the exemplary embodiment, the MGC will include the assigned network address in the radio access registration response message. Thus, when the WCD receives the radio access registration response acknowledging successful registration with the RAN, the WCD will receive in the response its newly assigned network address.

In accordance with a further aspect of the exemplary embodiment, once the WCD has completed its radio access registration and thereby acquired a network address, the WCD may then work to set up a packet-based real-time media communication session with a remote endpoint on the packet-switched network. If the WCD already has a network address of the remote endpoint, the WCD may simply engage in call setup signaling, such as SIP signaling or H.323 signaling, with the remote endpoint to establish the session. Alternatively, if the WCD has only a telephone number or other such identifier of a called party, a variation on the traditional call setup process can be used to provide the WCD with a network address of the remote endpoint, so that the WCD can then engage in call setup signaling with the remote endpoint to set up the session.

In an exemplary call setup variation, the WCD will send a traditional call origination message to the MGC (just as it would send a call origination message to an MSC), providing the MGC with a telephone number (or other identifier) of the called party. Yet, the WCD will include in the call origination message a special service option code that designates the call request as an address-translation request, rather than as a traditional call setup request. In response to detecting the special service option code in the call request, the MGC will then work to translate the dialed digits into a network address of a remote endpoint serving the called party. For instance, the MGC may query an address mapping system (AMS), such as an ENUM server. The MGC will then send a traditional call origination response message to the WCD, but the MGC will include in the call origination response message (e.g., in a user-definable field) the network address of the remote endpoint. Given its own network address (assigned during radio access registration) and given the network address of the remote endpoint, the WCD may then engage in call setup signaling (e.g., SIP signaling) to set up a packet-based real-time media session with the remote endpoint.

Advantageously, by assigning an network address to a WCD during the radio access registration process, and by providing a direct connection between the radio access network and the packet-switched network, the WCD can more seamlessly engage in packet-based real-time media communications and other sorts of packet-data communications. Without a PDSN in the communication path, no need arises to hand off sessions between PDSNs as the WCD moves from one coverage area to another, and thus the potentially substantial delay of inter-PDSN handoff can be avoided. Instead, what remains can be the traditional process of handing off from one BSC to another, in which the anchor BSC remains in the call path. (In an alternative embodiment, a PDSN or another such gateway can nevertheless remain in the call path. However, the WCD would still acquire its network address during the radio access registration process.)

These as well as other aspects, advantages, and alternatives will become apparent to those of ordinary skill in the art by reading the following detailed description, with reference where appropriate to the accompanying drawings. Further, it should be understood that the embodiments described in this

DETAILED DESCRIPTION OF AN EXEMPLARY EMBODIMENT

Figure 1:
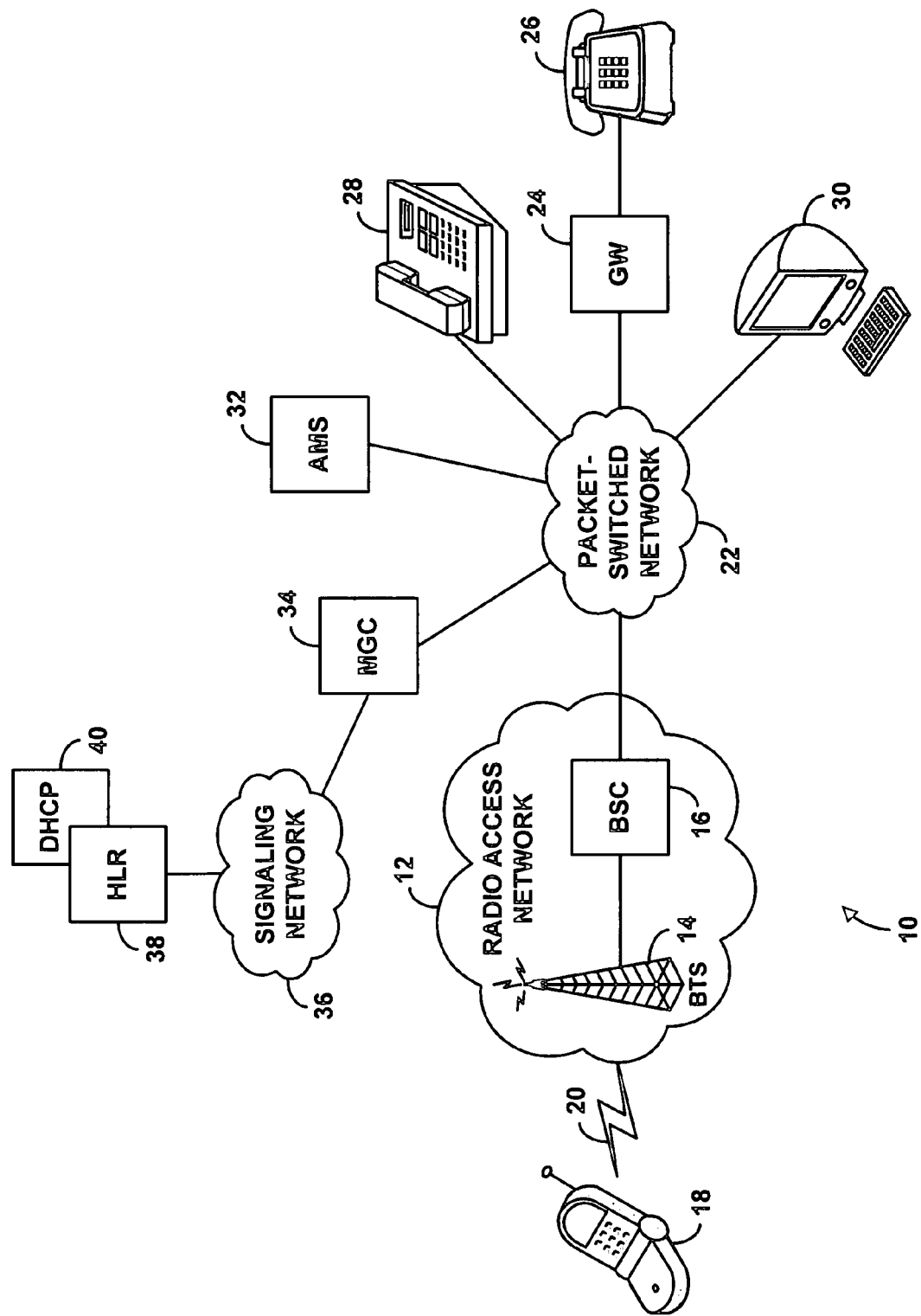
FIG. 1 is a block diagram of a communication system in which an exemplary embodiment of the invention can be implemented.

Referring to the drawings, FIG. 1 is a simplified block diagram depicting the arrangement of a communication system 10 in which an exemplary embodiment of the invention can be implemented. It should be understood, however, that these and other arrangements and processes shown and described herein are provided as examples only, and that many variations are possible. For instance, elements can be combined, distributed, omitted, added, or re-ordered. Further, the various logic functions described herein can be carried out by any combination of hardware, firmware and/or software, such as by one or more suitably programmed processors (e.g., one or more processors, data storage, and program instructions stored in the data storage and executable by the processor(s)), for instance.

As shown in FIG. 1, the communication system 10 includes a radio access network (RAN) 12, which includes, by way of example, a base transceiver station (BTS) 14 coupled with a base station controller (BSC) or other radio network controller (RNC) 16. Although only one BTS and one BSC are shown, the RAN could equally include a plurality of BTSs and a plurality of BSCs. As explained above, each BTS radiates to define one or more wireless coverage areas, such as cells and cell sectors, in which wireless communication devices can communicate with the BTS, and each BSC manages air interface communications with one or more BTSs. FIG. 1 depicts an example wireless communication device (WCD) 18 communicating over a radio frequency air interface 20 with BTS 14, or more generally with RAN 12.

BSC 16 is, in turn, coupled with a packet-switched network 22. More particularly, in the exemplary embodiment, BSC 16 sits as a node on packet-switched network 22. Thus BSC 16 is both an element of RAN 12 and a node on packet-switched network 22 (notwithstanding that the figure shows BSC 16 inside the cloud of RAN 12 and outside the cloud of network 22). BSC 16 may be tied to packet-switched network through conventional means, such as an Ethernet connection for instance, and possibly through a gateway function integrated with the BSC or located external to the BSC.

Packet-switched network 22 may include a wireless carrier's core packet network, i.e., a packet-data network over which a wireless carrier transports various traffic, such as signaling traffic and/or bearer traffic. Packet-switched network 22 may further include or interconnect with a public packet data network, such as the Internet, and/or one or more other networks, whether public or private. In a preferred embodiment, packet-switched network 22 carries traffic compliant with the well known Internet Protocol, so each entity that communicates on the network 22 would have an IP address. Other network and transport protocols could be used instead or in addition, however.

As further shown in FIG. 1, packet-switched network 22 provides connectivity with various remote endpoints, each equipped to communicate on the network, e.g., through IP communication. By way of example, the network 22 may provide connectivity with a remote gateway (e.g., a media gateway, IP telephony gateway, media terminal adapter, or the like) 24, which serves one or more telephone devices such as the example telephone 26 as shown. More particularly, gateway 24 may translate between legacy, circuit-switched communications with telephone 26 and packet-switched communications on network 22, to allow telephone 26 to place and receive calls over network 22. As other examples, network 22 may provide connectivity with an IP telephone device 28 and/or a multimedia computer 30, or for that matter with any other device adapted to communicate on network 22, whether the device is connected through landline and/or wireless links. (Although FIG. 1 depicts these endpoints on the other side of network 22, the endpoints could equally be served by RAN 12 as well, i.e., as other wireless communication devices.)

Additionally shown as a node on network 22, or accessible through network 22, is an address mapping system (AMS) 32, which can be arranged in a manner well known in the art to be able to translate between telephone numbers (or other identifiers) and network addresses, so as to facilitate IP telephony and the like. By way of example, AMS 32 can be an ENUM server or other address mapping system that includes data indicating mappings between telephone numbers and IP addresses and that includes a server function that can receive and respond to mapping requests based on the mapping data.

Further shown as a node on packet-switched network 22 is a media gateway controller (MGC) 34, which, as noted above, is also known in the art as a softswitch. MGC 34 is in turn coupled with a signaling network 36. Signaling network 36 may itself be a packet-switched network and may in fact be the same network as network 22 and/or may overlap in part with network 22. Signaling network 36 may be an out of band signaling network, in that it may support signaling communication according to a protocol such as the well known Signaling System #7 (SS7) for instance. As such, signaling network 36 may include a number of signal transfer points (STPs) (not shown) that function to route signaling traffic from point to point. Further, as shown, signaling network 36 provides connectivity with a home location register (HLR) 38

MGC 34 functions largely as an MSC, to support communications by devices such as WCD 18. (Although MGC is shown outside of the RAN cloud 12, MGC 34 could equally be illustrated in that cloud, since it functions as an element of the RAN.) As such, like a traditional MSC, MGC 34 may receive a registration message when WCD 18 enters a designated wireless coverage area, and MGC 34 may responsively send a registration notification message (e.g., an IS-41 REGNOT message) via signaling network 36 to HLR 38. In turn, MGC 34 may receive from HLR 38 a registration notification return message (e.g., an IS-41 regnot_rr), which may carry a service profile for WCD 18, and MGC 34 may store the service profile in a visitor location register (VLR) (not shown) for later reference and send a radio access registration response message to WCD 18. Further, MGC 34 may function as a switching point to set up calls over the PSTN (not shown) or over one or more other transport networks for WCD 18.

As noted above, in accordance with the exemplary embodiment, a WCD will acquire a network address during radio access registration, i.e., as part of its radio access registration process, rather than first registering with the radio access network and then seeking to acquire packet-data connectivity. In a preferred arrangement, this will be accomplished by having the HLR or an associated entity assign the network address and deliver the assigned address in a registration notification response message. However, the assignment of network address during radio access registration can be accomplished in other ways as well.

To facilitate assignment of a network address in the preferred embodiment, a Dynamic Host Configuration Protocol (DHCP) server function 40 will be provided in association with HLR 38, as shown in FIG. 1. By way of example, the DHCP server function 40 can be a function of the HLR itself, such as through program logic executed by the HLR. Alternatively, the DHCP server function 40 can be provided separately from the HLR, in a manner that allows the HLR to obtain a network address for WCD 18 from the DHCP server function. Optimally, the DHCP server function 40 can include a centralized DHCP server (not shown), located on packet-switched network 22 for instance, which functions to assign IP addresses for communication on network 22. DHCP proxies (not shown) can then be provided elsewhere, functioning to pass DHCP communications between the DHCP server and an entity requesting a network address, such as HLR 38.

As is well known in the art, a DHCP server operates to dynamically assign IP addresses (or other network addresses, for that matter) to DHCP clients. Conventionally, a DHCP client would broadcast a DHCP "DISCOVER" packet, in response to which a DHCP server would send a DHCP "OFFER" packet. The DHCP client would then send to that DHCP server a DHCP "REQUEST" packet, providing the server with the client's MAC address and requesting an IP address. In turn, the DHCP server then selects an IP address from a pool of available IP addresses, and sends a DHCP "ACK" packet to the client, providing the client with the assigned IP address (typically to be used for a limited period of time), and the server records the fact that the address is assigned to that client.

According to the exemplary embodiment, when the HLR 38 receives a registration notification message that requests, provides notice of, and/or otherwise indicates radio access registration of WCD 18, the HLR will invoke the DHCP server function 40 so as to have an IP address assigned for the WCD. To do this, for instance, the HLR may programmatically call the DHCP server function, passing to the DHCP server function a WCD that was conveyed in the registration notification message from RAN 12. More particularly, the HLR may send a DHCP REQUEST packet to the DHCP server function. The DHCP server function 40 may then assign an IP address for use by WCD 18 to communicate on packet-switched network 22 and may deliver that IP address to the HLR in a DHCP ACK packet. Alternatively, the HLR or some other associated entity could otherwise select an IP address from a pool of available IP addresses, and assign the selected IP address for use by the WCD.

Note that the HLR 38 may carry out this function after the WCD is first authorized for service in the RAN. By way of example, once the HLR 38 receives a registration notification message from MGC 34, the HLR, either alone or in combination with an authentication center (not shown), can work conventionally to authenticate the WCD 18 so as to ensure that WCD 18 is entitled to have radio network access. Once that authentication process is complete, the HLR may then invoke the DHCP function 40 or otherwise assign, or have assigned, an IP address for use by WCD 18. Alternatively, the HLR may invoke the address-assignment function before or concurrently with the authentication function.

Figure 2:
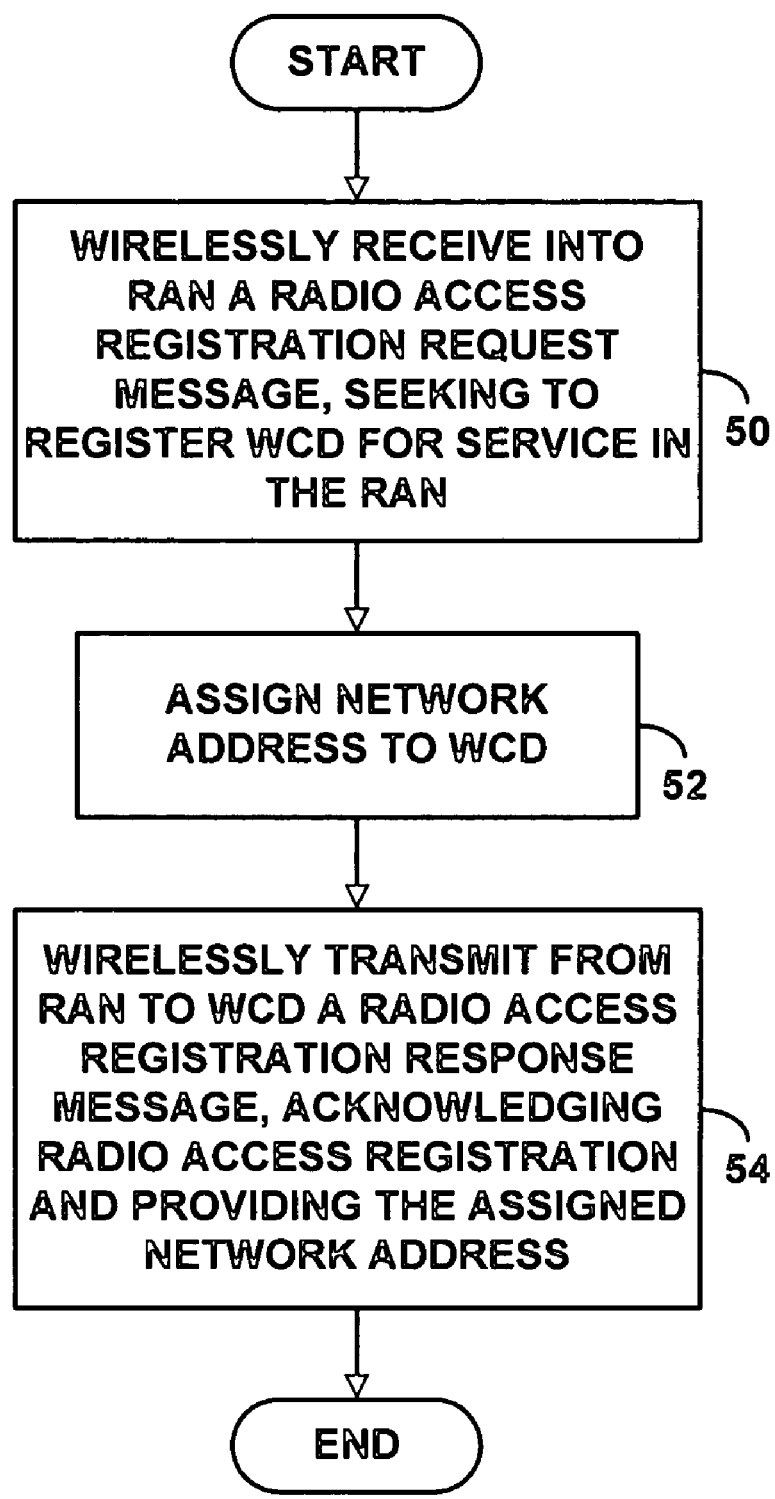
FIG. 2 is a flow chart depicting functions carried out in accordance with the exemplary embodiment to assign a network address to a WCD during radio access registration.

FIG. 2 next provides a flow chart depicting functions carried out to assign a network address to WCD 18 during its radio access registration process, in accordance with the exemplary embodiment. As shown in FIG. 2, at block 50, a wireless carrier (e.g., cellular service provider) or other entity wirelessly receives into RAN 12 from WCD 18 a radio access registration request message seeking to register WCD 18 for wireless communication in the RAN. In a CDMA system, for instance, this function can involve receiving one or more access probes transmitted in an air interface access channel from the WCD.

At block 52, the wireless carrier then assigns a network address, preferably an IP address, to WCD 18, for use by the WCD to engage in communications on packet-switched network 22. This function may occur, for instance, after MGC 34 sends a registration notification message to HLR 38 in response to the radio access registration request message, and possibly after the HLR 38 and/or an authentication center completes authentication of the WCD. Further, as noted above, this function may involve the HLR or another entity invoking a DHCP server function (or other IP address assignment function) to assign an IP address for use by the WCD. Alternatively, this function could occur at some other point during the radio access registration process. For instance, MGC 34 itself could be set to assign an IP address to the WCD (e.g., applying or otherwise invoking a DHCP server function or the like) or to invoke an address-assignment function.

At block 54, the wireless carrier in turn transmits to the WCD 18 from RAN 12 a radio access registration response message that (i) acknowledges registration of WCD 18 for wireless communication service in the RAN and (ii) specifies the assigned network address for use by the WCD. In a CDMA system, for instance, this function may involve sending the radio access registration response message in one or more fields of an air interface paging channel message, setting forth in the registration response message (e.g., in one or more user-definable fields) the assigned IP address. Further, in an arrangement where the HLR 38 assigns (or causes to be assigned) an IP address for use by the WCD, the HLR could set forth the IP address in a registration notification response message or any other sort of message that the HLR sends to MGC 34, and MGC 34 may then include that assigned IP address in its radio access registration response message to the WCD. In a preferred embodiment, the IP address would be set forth in a predefined field of the radio access registration response message, whether that field is currently available user-definable field or a newly added field.

As further noted above, in accordance with the exemplary embodiment, after a WCD has acquired a network address during radio access registration, the WCD may then conveniently use its network address to enter into various packet-data communications. In the arrangement of FIG. 1, for instance, after WCD 18 has acquired an IP address during its radio access registration, WCD 18 may use the IP address to engage in communications with endpoint nodes such as IP telephone 28, gateway 24, and/or computer 30. In a preferred embodiment, for example, WCD 18 may engage in IP-based session setup signaling with one or more of these (or other) entities to establish a packet-based real-time media session, such as an RTP session.

Mechanics for setting up a packet-based real time media session are well known in the art and therefore are not described here in great detail. Merely as an example, either of the well known SIP protocol or H.323 protocol could be used to set up such a session.

With SIP, for instance, each endpoint typically has an assigned "SIP address" (usually in the form username@realm). When an endpoint goes online, it may register with a SIP registration server, to give the server a correlation between its SIP address and its IP address, so as to facilitate routing of signaling message to its SIP address. As presently contemplated, after WCD 18 acquires an IP address during radio access registration, WCD 18 may thus register with a SIP registration server (not shown) on packet-switched network 22, to give the server a correlation between its assigned IP address and its SIP address (or a SIP address of a user of WCD 18).

To initiate a packet-based real-time media session with a remote endpoint on network 22, WCD 18 may then send a SIP "INVITE" message to the SIP address of that endpoint, describing in the SIP INVITE message the type of session desired. If the remote endpoint agrees to participate in the session, it may then return to WCD 18 a SIP "200 OK" message, indicating its agreement. In turn, WCD 18 may complete session setup by sending a SIP "ACK" to the remote endpoint. (Alternatively, the remote endpoint may initiate a packet-based real-time media session with WCD 18, by sending a SIP INVITE to WCD 18, and so forth.) By this signaling process, WCD 18 and the remote endpoint may work to set up an RTP session or other packet-based real-time media session, carrying voice (e.g., VoIP), video, and/or any other media between their IP addresses.

With H.323 (and its associated protocols, such as H.225 and H.245), WCD 18 may similarly initiate a packet-based real-time media conference after acquiring its IP address. By way of example, WCD 18 may first send an H.225 Call Setup Request from its IP address to the IP address of the remote endpoint. In response, the remote endpoint may then send an H.225 OK message to WCD 18. WCD 18 may then send an H.245 Open Media Request to the remote endpoint, and the remote endpoint may respond with an H.245 Open Media OK. And WCD 18 and the remote endpoint may then similarly begin exchanging media, such as voice and video, with each other between their respective IP addresses.

In some cases, WCD 18 may already know the SIP address or IP address of the remote endpoint and may thus be able to conveniently initiate packet-based real-time media sessions with the remote endpoint. (For instance, WCD 18 may have a local directory with an entry that lists the endpoint's SIP address or IP address. When a user of WCD 18 seeks to call the endpoint by selecting the entry from the directory, WCD 18 may then initiate session setup signaling with the endpoint's SIP address or IP address.)

In other cases, however, all WCD 18 may have is a telephone number or other identifier of the remote endpoint, but not a SIP address, IP address, or other network address at which WCD 18 can engage in session setup signaling. For instance, a user of WCD 18 may input just the telephone number of a remote device (such as telephone 28, telephone 26, or computer 30) or may select a directory listing that specifies just a telephone number of the device. In accordance with the exemplary embodiment, in order to provide WCD 18 with a network address of the remote endpoint, a variation on the conventional call origination process can be used, as generally illustrated by FIG. 3.

Figure 3:
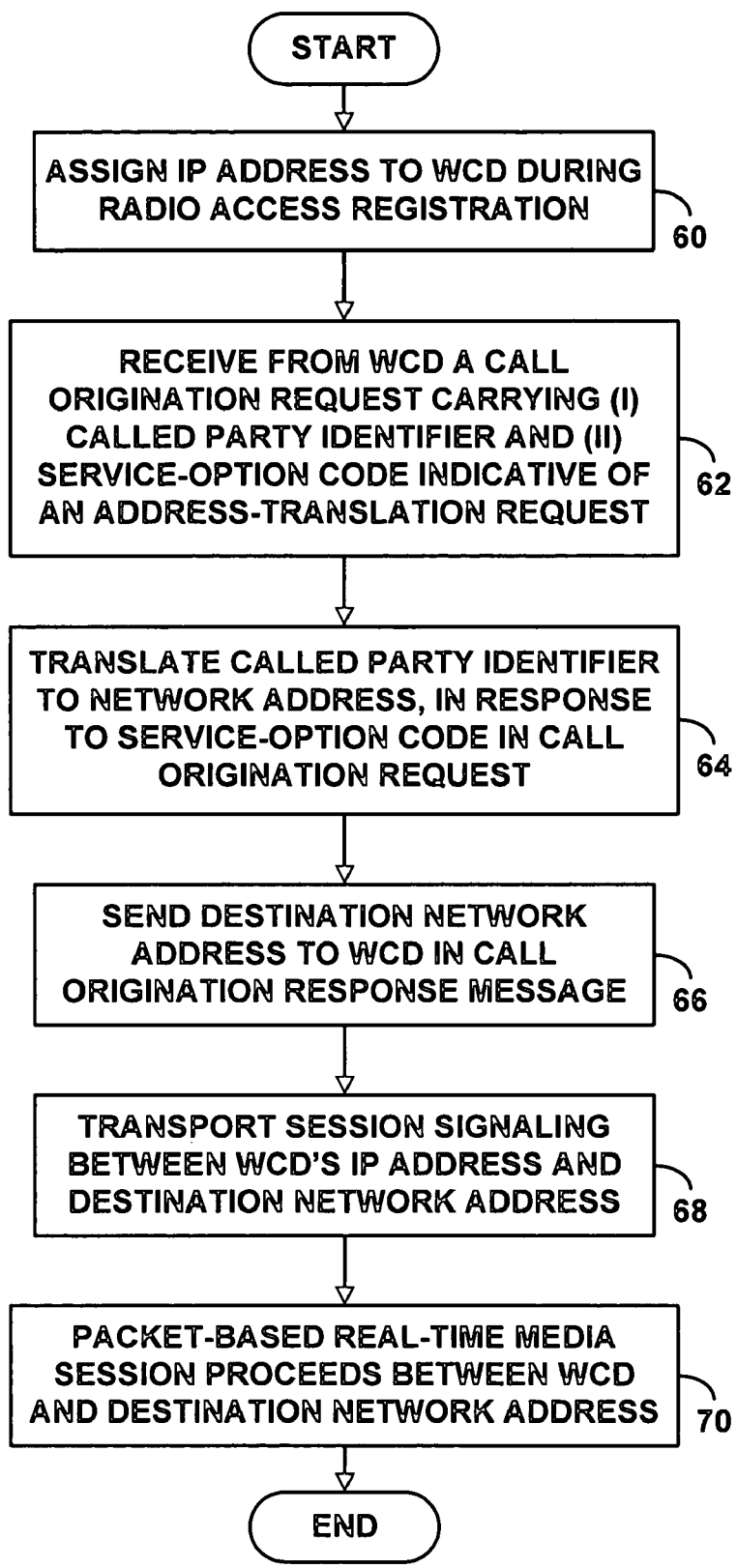
FIG. 3 is a flow chart depicting functions carried out in accordance with the exemplary embodiment to facilitate session setup after the WCD has acquired a network address during radio access registration.

As shown in FIG. 3, at block 60, WCD 18 first acquires an IP address during its radio access registration process, as described above. At block 62, a call controller then receives from the WCD an origination request seeking to establish a call (i.e., real-time media session) to a called party. In the preferred embodiment, the call controller will be MGC 34. Further, the origination request will preferably be a conventional IS-41 call-origination request that carries dialed digits representing the called party. (As is known in the art, "dialed digits" may or may not be actually "dialed" and may further include one or more numerals and/or one or more other characters.) Like other signaling to MGC 34, the origination request may thus pass over the air to RAN 12 and, in turn, over packet-switched network (over IP) to MGC 34.

In the variation as presently contemplated, the origination request to MGC 34 will carry a special service-option code, which MGC 34 will treat as an indication that the origination request is an address-translation request. In response to the address-translation request, MGC 34 will then engage in an address-translation process, at block 64, so as to determine a network address at which WCD 18 can engage in session-setup signaling so as to set up the call to the called party. For instance, MGC 34 may send an address-translation request via packet-switched network 22 to AMS 32, providing AMS 32 with the dialed digits that were carried in the request from WCD 18. AMS 32 may then perform a lookup to determine a SIP address, IP address, or other network address of a remote endpoint serving the dialed digits, such as an address on packet-switched network 22 of IP telephone 28, gateway 24 (serving telephone 26), or computer 30. And AMS 32 may then return that network address to MGC 34 in a response message. In an alternative arrangement, MGC 34 itself, or some other entity, can perform the address translation.

At block 66, MGC 34 may then send the determined network address of the remote endpoint to WCD 18 in a call origination response message. In a preferred embodiment, the determined network address would be set forth in a pre-defined field of the call origination response message, whether the field is a currently available user-definable field or a newly defined field. At block 68, the wireless carrier may then transport call setup signaling that is being communicated between the IP address of the WCD 18 and the determined network address of the remote endpoint. That is, session setup signaling, such as SIP signaling or H.323 signaling for instance, will pass through the wireless carrier's system (e.g., RAN 12) as it flows between WCD 18 and the remote endpoint. As a result, at block 70, a packet-based real-time media session (such as a VoIP session, for instance), will be established between WCD 18 and the remote endpoint.

As noted above, by assigning a network address to WCD 18 during its radio access registration process and, preferably, by giving BSC 16 a direct connection with packet-switched network 22, conventional mobility management techniques can be used to manage handoff of the resulting real-time media session. For instance, as WCD 18 moves from the coverage area of BSC 16 into the coverage area of another BSC (not shown), BSC 16 can remain the anchor BSC, and session traffic can be shunted between the BSC 16 and the currently serving BSC.

An exemplary embodiment of the present invention has been described above. Those skilled in the art will understand, however, that changes and modifications may be made to this embodiment without departing from the true scope and spirit of the invention, which is defined by the claims.

What is claimed is:

1. A method comprising:
   wirelessly receiving into a radio access network (RAN) from a wireless communication device (WCD) a radio access registration message seeking to register the WCD for wireless communication service in the RAN;
   thereafter assigning a network address to the WCD, for use by the WCD to engage in communications on a packet-switched network;
   wirelessly transmitting to the WCD from the RAN, in response to the radio access registration message, a radio access registration response message, wherein the radio access registration response message acknowledges registration of the WCD for wireless communication service in the RAN and specifies the assigned network address for use by the WCD; and after transmitting the radio access registration response message, with the assigned network address, to the WCD, (i) receiving into a call controller from the WCD a call origination request seeking to establish a call to a called party, and responsively sending to the WCD a network address of a remote endpoint serving the called party, and (ii) transporting call setup signaling that is being communicated between the assigned network address of the WCD and the network address of the remote endpoint, for setting up the call as a packet-based real-time media session between the WCD and the remote endpoint, wherein the origination request carries a service option code, and wherein sending the network address of the remote endpoint to the WCD comprises sending the network address of the remote endpoint in response to detection of the service option code in the origination message.

2. The method of claim 1, wherein the network address is an Internet Protocol (IP) address.

3. The method of claim 1, further comprising:

in response to the radio access registration message from the WCD, sending a registration notification message from the RAN to a home location register (HLR) that serves the WCD; and generating a registration notification response message containing the assigned network address, and sending the registration notification response message from the HLR to the RAN, wherein transmitting the radio access registration response message to the WCD comprises transmitting the radio access registration response message to the WCD in response to the registration notification response message from the HLR.

4. The method of claim 3, wherein assigning the network address comprises the HLR assigning the network address.

5. The method of claim 3, wherein the HLR includes a Dynamic Host Configuration Protocol (DHCP) server function, and wherein assigning the network address comprises the DHCP server function assigning the network address.

6. The method of claim 3, wherein assigning the network address comprises a Dynamic Host Configuration Protocol (DHCP) server function assigning the network address, the method further comprising the DHCP server function sending the assigned network address to the HLR, and the HLR including the assigned network address within the registration notification response message.

7. The method of claim 1, wherein the registration notification message comprises an IS-41 Registration Notification message, and the registration notification response message comprises an IS-41 Registration Notification return result message.

8. The method of claim 1, wherein the call controller comprises a media gateway controller.

9. The method of claim 1, wherein the origination message comprises an IS-41 origination message, and wherein responsively giving the WCD a network address of a remote endpoint serving the called party comprises sending to the WCD an IS-41 origination response message that specifies the network address of the remote endpoint.

10. The method of claim 1, further comprising:

in response to the call origination request, determining the network address of the remote endpoint, before sending the network address of the remote endpoint to the WCD.

11. The method of claim 1, wherein determining the network address of the remote endpoint comprises querying an address mapping system, based on dialed digits provided in the origination request from the WCD.

12. The method of claim 1, wherein the call setup signaling comprises signaling selected from the group consisting of Session Initiation Protocol (SIP) signaling and H.323 signaling.

13. The method of claim 1, wherein the remote endpoint comprises an entity selected from the group consisting of (i) a remote gateway that serves a client station operated by the called party, and (ii) a client station operated by the called party.

14. The method of claim 1, wherein the packet-based real-time media session comprises a voice-over-IP (VoIP) session.

15. A method comprising:

receiving into a radio access network (RAN), over an air interface from a wireless communication device (WCD), a first registration message for registering the WCD in a cellular wireless coverage area;

in response to the first registration message, sending from the RAN to a home location register (HLR) a second registration message indicating registration of the WCD in the cellular wireless coverage area;

in response to the second registration message, assigning an Internet Protocol (IP) address for use by the WCD to engage in IP-based communications on a packet-switched network, and sending from the HLR to the RAN a first registration response message that acknowledges registration of the WCD in the cellular wireless coverage area and that specifies the assigned IP address;

in response to the first registration response message, sending from the RAN to the WCD a second registration response message that acknowledges registration of the WCD in the cellular wireless coverage area and that further specifies the assigned IP address;

thereafter receiving from the WCD into a call controller a call origination message seeking to establish a call to a called party;

in response to the call origination message, determining a network address of a remote endpoint serving the called party, and sending from the call controller to the WCD an origination response message that specifies the network address of the remote endpoint, wherein the origination message carries a service option code, and wherein sending the network address of the remote endpoint to the WCD comprises sending the network address of the remote endpoint in response to detection of the service option code in the origination message; and thereafter conveying IP-based call setup signaling between the assigned IP address of the WCD and the network address of the remote endpoint, for setting up the call as a packet-based real-time media session between WCD and the remote endpoint.

16. The method of claim 15, wherein the second registration message comprises an IS-41 registration notification message, and wherein the first registration response message comprises an IS-41 registration notification return result message.

17. The method of claim 15, wherein the HLR includes or has access to a Dynamic Host Configuration Protocol (DHCP) server function, and wherein assigning the IP address for use by the WCD comprises the DHCP server function assigning the IP address for use by the WCD.

18. A communication system comprising:
- a radio access network (RAN) including a base transceiver station (BTS) coupled with a radio network controller (RNC), wherein the BTS defines a wireless coverage area in which wireless communication devices can wirelessly communicate with the BTS; and
- a media gateway controller (MGC) in communication with the RNC and further in communication with a home location register,
- wherein the MGC receives a radio access registration message from a wireless communication device (WCD) that is located within the cellular wireless coverage area, and the MGC responsively sends a registration notification message to the HLR,
- wherein the HLR assigns an Internet Protocol (IP) address for use by the WCD and sends the assigned network address in a registration notification response message to the MGC, and wherein the MGC sends the assigned network address in a radio access registration response message to the WCD,
- wherein, after sending the radio access registration response message to the WCD, the MGC receives from the WCD a call origination request message seeking to set up a call with a called party, and the MGC responsively sends to the WCD a call origination response message that specifies a network address of a remote endpoint that serves the called party, wherein the MGC determines the network address of the remote endpoint by querying an address mapping system, and wherein the call origination request message carries a predetermined service-option code that triggers the MGC to determine the network address of the remote endpoint and to provide the network address of the remote endpoint to the WCD in the call origination response message, and
- wherein call setup is then communicated between the assigned network address of the WCD and the network address of the remote endpoint, for establishing a packet-based real-time media session between the WCD and the remote endpoint.

* * * * *